(12) United States Patent
Ho et al.

(10) Patent No.: US 10,911,827 B2
(45) Date of Patent: Feb. 2, 2021

(54) AUTOMATIC RATING OF CROWD-STREAM CALLER VIDEO

(71) Applicant: Kiswe Mobile Inc., Rockville, MD (US)

(72) Inventors: Yung-Lung Ho, Bethesda, MD (US); Wim Sweldens, Summit, NJ (US); Tom Cuypers, Tongeren (BE); Bert De Decker, Hasselt (BE)

(73) Assignee: Kiswe Mobile Inc., Rockville, MD (US)

( * ) Notice: Subject to any disclaimer, the term of this patent is extended or adjusted under 35 U.S.C. 154(b) by 0 days.

(21) Appl. No.: 16/401,420

(22) Filed: May 2, 2019

(65) Prior Publication Data

US 2020/0288200 A1 Sep. 10, 2020

Related U.S. Application Data

(60) Provisional application No. 62/815,694, filed on Mar. 8, 2019.

(51) Int. Cl.
| | |
|---|---|
| *H04N 21/462* | (2011.01) |
| *H04N 21/2187* | (2011.01) |
| *H04N 21/45* | (2011.01) |
| *H04N 21/218* | (2011.01) |
| *H04N 21/2343* | (2011.01) |
| *H04N 21/2665* | (2011.01) |

(52) U.S. Cl.
CPC ..... *H04N 21/4622* (2013.01); *H04N 21/2187* (2013.01); *H04N 21/21805* (2013.01); *H04N 21/23439* (2013.01); *H04N 21/2665* (2013.01); *H04N 21/4524* (2013.01)

(58) Field of Classification Search
CPC .......... H04N 21/4622; H04N 21/2187; H04N 21/23439; H04N 21/2665; H04N 21/4524; H04N 21/21805
See application file for complete search history.

(56) References Cited

U.S. PATENT DOCUMENTS

| | | | |
|---|---|---|---|
| 9,635,431 B2 | 4/2017 | Zane et al. | |
| 9,654,844 B2 | 5/2017 | Kim et al. | |
| 9,661,355 B2 | 5/2017 | Ho | |

(Continued)

*Primary Examiner* — Michael A Keller
(74) *Attorney, Agent, or Firm* — Ryan, Mason & Lewis, LLP

(57) ABSTRACT

A method comprises receiving video streams from a plurality of mobile devices associated with respective distinct users of a crowd-stream video application, evaluating the received video streams relative to an event of interest, selecting particular ones of the video streams for use in generation of crowd-stream video output based at least in part on results of the evaluating, generating the crowd-stream video output utilizing at least portions of the selected video streams, and providing the crowd-stream video output to one or more servers of a content delivery network for delivery to one or more viewer devices. The video streams illustratively comprise live video streams of the event of interest captured by respective ones of the mobile devices. In some embodiments, evaluating the received video streams relative to an event of interest comprises evaluating the received video streams in terms of at least vantage point relative to the event of interest.

24 Claims, 4 Drawing Sheets

(56) References Cited

U.S. PATENT DOCUMENTS

| | | | |
|---|---|---|---|
| 9,832,491 B2 | 11/2017 | Ho | |
| 9,900,362 B2 | 2/2018 | Kim et al. | |
| 9,942,343 B2 | 4/2018 | Zane et al. | |
| 10,182,270 B2 | 1/2019 | Kim et al. | |
| 10,438,448 B2* | 10/2019 | Piccionielli | G10H 1/0058 |
| 2011/0173638 A1* | 7/2011 | Nakamae | G06Q 10/10 |
| | | | 719/318 |
| 2014/0240578 A1* | 8/2014 | Fishman | H04N 5/23293 |
| | | | 348/333.08 |
| 2015/0297949 A1* | 10/2015 | Aman | G06T 7/246 |
| | | | 348/157 |
| 2016/0110433 A1* | 4/2016 | Sawhney | G06F 40/30 |
| | | | 707/722 |
| 2017/0024094 A1* | 1/2017 | Gresham | G06Q 50/10 |
| 2018/0198641 A1* | 7/2018 | Gilani | H04L 12/66 |
| 2018/0220165 A1* | 8/2018 | Shaw | H04N 21/2353 |
| 2019/0164135 A1* | 5/2019 | Bellary | G06Q 10/1095 |
| 2019/0213423 A1* | 7/2019 | Haberstroh | H04W 4/021 |
| 2020/0204834 A1* | 6/2020 | Loheide | H04N 21/8549 |

\* cited by examiner

AUTOMATIC RATING OF CROWD-STREAM CALLER VIDEO

PRIORITY CLAIM

This application claims priority to U.S. Provisional Patent Application Ser. No. 62/815,694, filed Mar. 8, 2019 and entitled "Automatic Rating of Crowd-Stream Caller Video," which is incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the available modes of media consumption. In these and other contexts, a wide variety of different media streaming techniques are known, including techniques for streaming of media over the Internet using hypertext transfer protocol (HTTP). A more specific example of an HTTP streaming technique is the Apple HTTP Live Streaming (HLS) protocol. Despite recent advances in this area, a need remains for improved techniques for streaming of live video and other types of media content.

SUMMARY

Illustrative embodiments of the invention provide content delivery systems with functionality for automatic rating of crowd-stream caller video.

For example, some embodiments comprise multiple mobile devices, a moderator station and a media server cluster, as well as other system components, with the system being configured to automatically rank caller video streams using, for example, vantage point relative to an event of interest, and possibly additional or alternative metrics relative to the event of interest, such as image quality and/or subject relevancy. The rankings are utilized in selection of particular caller videos for automated generation of crowd-stream video output that is provided to one or more servers of a content delivery network.

In one embodiment, a method comprises receiving video streams from a plurality of mobile devices associated with respective distinct users of a crowd-stream video application, evaluating the received video streams relative to an event of interest, selecting particular ones of the video streams for use in generation of crowd-stream video output based at least in part on results of the evaluating, generating the crowd-stream video output utilizing at least portions of the selected video streams, and providing the crowd-stream video output to one or more servers of a content delivery network for delivery to one or more viewer devices.

The video streams illustratively comprise live video streams of the event of interest captured by respective ones of the mobile devices.

In some embodiments, evaluating the received video streams relative to an event of interest comprises evaluating the received video streams in terms of at least vantage point relative to the event of interest.

Additionally or alternatively, evaluating the received video streams relative to an event of interest illustratively comprises applying at least one artificial intelligence algorithm to automatically rank the video streams based at least in part on one or more vantage point metrics, one or more image quality metrics, and/or one or more other metrics, computed for each of at least a subset of the received video streams.

A wide variety of other embodiments are possible, supporting numerous alternative use cases involving live video and other types of media content.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Illustrative embodiments include but are not limited to methods, apparatus, systems, processing devices, integrated circuits, and computer-readable storage media having computer program code embodied therein.

Some embodiments are configured to utilize streaming techniques that are based at least in part on the above-noted Apple HLS protocol. However, it is to be appreciated that other embodiments can be configured utilizing a wide variety of other types of streaming protocols and accordingly are not limited to use with live streaming or HTTP.

Additionally or alternatively, some embodiments are configured to utilize techniques disclosed in one or more of U.S. Pat. No. 9,635,431, entitled "Live Event Viewing via Mixed Live and On-Demand Streaming," U.S. Pat. Nos. 10,182,270 and 9,654,844, both entitled "Methods and Apparatus for Content Interaction," U.S. Pat. Nos. 9,661,355 and 9,832,491, both entitled "Virtual Immersion Via Streamed Content Adaptation," U.S. Pat. No. 9,900,362, entitled "Methods and Apparatus for Reducing Latency Shift in Switching Between Distinct Content Streams," and U.S. Pat. No. 9,942,343, entitled "Efficient Content Streaming Utilizing Local Proxy Server Implemented on Client Device," each of which is incorporated by reference herein in its entirety. It is to be appreciated, however, that utilization of such techniques is not a requirement in any particular embodiment of the present invention.

Figure 1:
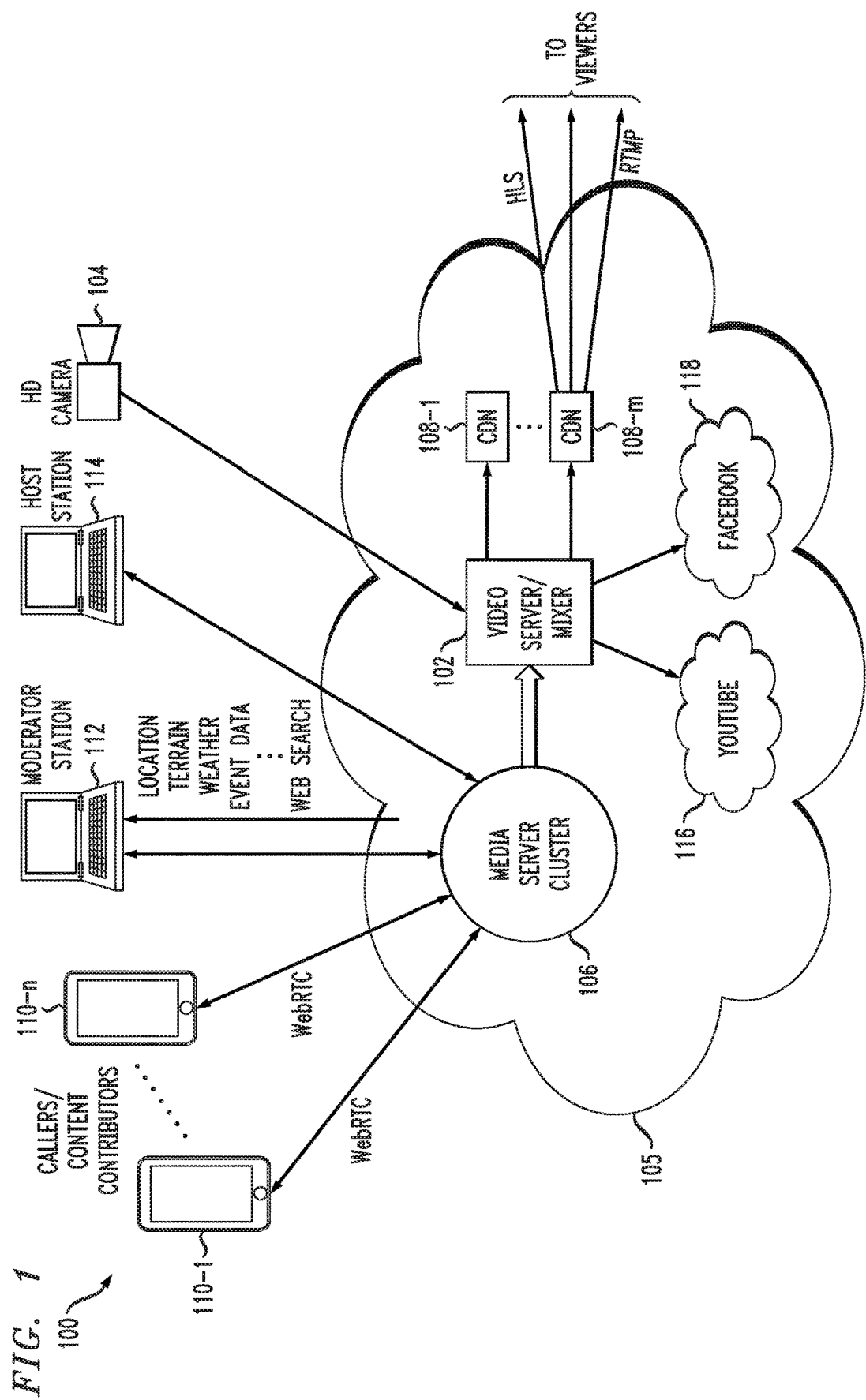
FIG. 1 is a block diagram of an exemplary content delivery system with functionality for automatic rating of crowd-stream caller video in an illustrative embodiment.

FIG. 1 shows a content delivery system 100 that implements functionality for automatic rating of crowd-stream caller video in an illustrative embodiment. In this embodiment, the content delivery system 100 illustratively comprises a video server/mixer 102. At least a portion of the video server/mixer 102 can be implemented as a live media server. The video server/mixer 102 receives live video from a high definition (HD) camera 104 that is assumed to be arranged to capture video of a live event. Although only a single HD camera 104 is shown in this embodiment, multiple HD cameras can be deployed to provide multiple live video streams to the video server/mixer 102 in other embodiments.

The video server/mixer 102 is implemented as part of a network 105 that includes a media server cluster 106 and a plurality of content delivery network (CDN) web servers 108-1, . . . **108-*m*. The video server/mixer 102 provides HLS streams including media segments and associated playlists to the CDN web servers 108. The CDN web servers 108** deliver content streams to respective client devices of respective viewers responsive to requests received from those client devices. Each such client device implements a media player for requesting and playing content for its corresponding viewer. The client devices of the respective viewers are not explicitly shown in the figure, but can include various types of mobile devices, as well as other types of client devices such as desktop computers.

The content delivery system 100 in this embodiment further comprises a plurality of mobile devices 110-1, . . . **110-*n*, a moderator station 112, a host station 114, all coupled to the media server cluster 106 as illustrated. The video server/mixer 102 receives one or more video streams from the media server cluster 106 and as noted above is also coupled to the HD camera 104 that provides live video. The video server/mixer 102 mixes at least portions of the one or more video streams provided by the media server cluster 106 and the HD camera 104 and provides corresponding output streams including media segments and associated playlists to the CDN web servers 108**.

Such streams are additionally provided to other destinations, such as YouTube 116 and Facebook 118. Servers of these and other social media platforms are considered examples of what are more generally referred to herein as servers of a content delivery network. In other words, social media platforms such as YouTube 116 and Facebook 118 are considered a type of "content delivery network" as that term is broadly used herein.

The playlists may be illustratively implemented as respective "index files," although other types of playlists can be used in other embodiments. Such an index file or other type of playlist in some embodiments illustratively provides an ordered list of the Uniform Resource Locators (URLs) of the corresponding media segments. Other types of media segment identifiers can be used in other embodiments.

Many different protocols can be used for streaming audio and video in illustrative embodiments. These include RTP, RTMP, WebRTC, and HLS. Illustrative embodiments are independent of the particular video streaming protocol used in any part of the system, although some embodiments are configured to use more real time protocols such as WebRTC and RTMP between the mobile devices 110, the moderator and host stations 112 and 114, the media server cluster 106, the video server/mixer 102, and the distributor comprising one or more of the CDN web servers 108. For example, as illustrated in the figure, the mobile devices 110 illustratively communicate with the media server cluster 106 using WebRTC.

The "distributor" as that term is broadly used herein is intended to encompass, for example, a service provider or other content distribution entity providing at least a subset of the CDN web servers 108. The distributor would typically deliver the content using protocols such as HLS that scale well for a large number of viewers using CDN technology. Again, other types of protocols such as RTMP could additionally or alternatively be used. In the present embodiment, the system 100 as illustrated utilizes both HLS and RTMP in communicating content from CDN web servers 108 to client devices of the respective viewers.

The automatic rating of crowd-stream caller video in the system of FIG. 1 will now be described in more detail.

Radio and television talk shows have long featured call-in segments where anyone with a phone can dial in and become part of the show. Traditionally with this format, one or more moderators manning a switchboard would interview callers before patching them through to the show's host. Crowd-stream video can theoretically be leveraged to provide advantages such as reduced cost and broader audience reach in this context. However, practical implementations of such arrangements present a number of significant challenges. For example, one significant challenge to implementation of crowd-stream video in this context is that a moderator may have to sort through an excessively large number of callers having video streams to present. At the same time, for certain events, the moderator may be time constrained to pick out the callers with the best view and video quality before the moment passes, e.g., a disaster unfolding. Conventional approaches are unable to provide an adequate solution to such problems, and as a result unduly limit the potential of crowd-stream video applications.

Some embodiments address these and other issues by utilizing data gathering and computing capabilities of the mobile devices 110 and the servers of the media server cluster 106 to automatically rank a caller's vantage point, image quality and/or subject relevancy advantages before submitting the top candidates to a potentially fully automated moderator entity for final selections. These and other features and advantages of illustrative embodiments will be become readily apparent from the following description.

The FIG. 1 system in the present embodiment is illustratively configured to implement a crowd-sourced streaming broadcast show or other type of crowd-sourced streaming presentation. As shown, callers equipped with respective video-capture-capable mobile devices 110 can connect to at least one networked media server of the media server cluster 106. The media server cluster 106 in some embodiments comprises a cloud-based media server cluster, such as, for example, a Wowza Streaming Engine platform, illustratively implemented utilizing virtualization infrastructure, such as virtual machines or containers, in the cloud. The media server cluster 106 is assumed to comprise multiple servers, and different ones of the mobile devices 110 can connect to different ones of the servers of the media server cluster 106. Preferably, real time communications protocols, such as the above-noted WebRTC protocol, are utilized to reduce delay and jitter.

The moderator station 112 and the host station 114 comprise computers associated with respective moderator and host entities of the system 100. Such entities can comprise automated entities such as bots, although one or both of the moderator and the host can be human entities. It is also possible that the moderator and the host can be the same entity, or different portions of a single bot or other automated entity. In such an arrangement, the moderator station 112 and the host station 114 can be implemented as a single computer or other processing device, or as a portion of such a processing device.

Although shown as being outside of the network 105 in the FIG. 1 embodiment, the moderator station 112 and/or the host station 114 can in other embodiments comprise one or more cloud-based processing devices implemented within the network 105, possibly as part of or in proximity to one or more processing devices utilized to implement media server cluster 106 and/or video server/mixer 102. For example, it is possible in other embodiments for the moderator station 112, the host station 114, the media server cluster 106 and the video server/mixer 102 to be implemented on a single processing platform accessible to the mobile devices 110 over the network 105.

In some embodiments, the host is an entity that the viewers can see and/or hear in a given crowd-sourced streaming broadcast show or other type of crowd-sourced streaming presentation provided by system 100, while the moderator is an entity that determines which callers have access to the host as well as the potential to have their respective video streams utilized in generating a crowd-stream video output as at least a portion of a presentation delivered to viewers via the CDN web servers 108. Again, such entities are illustratively implemented as respective bots or other automated entities in some embodiments.

As will be described in more detail below, illustrative embodiments apply to high degree of automation to the moderator functionality, such as via automated ranking of video streams received from respective ones of the mobile devices 110 in terms of vantage point relative to an event of interest, and possibly additional or alternative metrics such as image quality and/or subject relevance relative to the event of interest. Other specific examples of metrics that may be used in automatic ranking of video streams in some embodiments include mobile device orientation, remaining battery life of a mobile device, and bandwidth of a connection between a mobile device and a server. Various combinations of these and other metrics can be used in other illustrative embodiments.

In the FIG. 1 embodiment, the moderator station 112 and the host station 114 are configured to communicate with the media server cluster 106 via the network 105. Internal to one or more of the media servers of the media server cluster 106, the host and the moderator are configured to be able to communicate with each of the callers and with each other. The callers, however, are isolated from one another until after the video server/mixer 102 has mixed the chosen videos. The system 100 is sufficiently flexible to accommodate multiple moderators and/or multiple hosts in other embodiments.

The video server/mixer 102 is illustratively configured to mix multiple caller media streams with one or more HD camera feeds possibly from disparate locations. The output video can then be broadcast streamed via CDN web servers 108 of one or more CDNs directly to the public, and/or archived at sites such as YouTube 116 or Facebook 118. It is expected in some embodiments that any member of the Internet public can become a content contributor by calling in and connecting to the show's online site.

The mobile devices 110 are associated with respective callers/content contributors to a crowd-sourced streaming broadcast show or other type of crowd-sourced streaming presentation, more generally referred to herein as "crowd-stream video." Each of the callers/content contributors represents a distinct user of a crowd-stream video application configured to allow callers to contribute video streams to a given crowd-sourced streaming presentation. The system 100 via at least a subset of its components 102, 106, 112 and 114 is configured to receive video streams from respective ones of the mobile devices 110 associated with respective distinct users of the crowd-stream video application, to evaluate the received video streams relative to an event of interest possibly using vantage point and/or other characteristics, to select particular ones of the video streams for use in generation of crowd-stream video output based at least in part on results of the evaluating, to generate the crowd-stream video output utilizing at least portions of the selected video streams, and to provide the crowd-stream video output to one or more of the CDN web servers 108 for delivery to one or more client devices of the viewers. Such client devices are more generally referred to herein as "viewer devices."

The video streams received from the respective mobile devices 110 illustratively comprise live video streams of the event of interest captured by respective ones of the mobile devices 110. However, other embodiments can utilize recorded rather than live video streams of an event of interest, or combinations of live and recorded video streams.

One or more of the users of the crowd-stream video application each illustratively access the application by establishing a connection to a host website via a corresponding one of the mobile devices 110.

In some embodiments, the system 100 is further configured to obtain location information (e.g., GPS coordinates) from one or more of the mobile devices 110, and to determine a location of the event of interest based at least in part on the obtained location information.

For example, the obtained location information from one or more of the mobile devices 110 can be used to generate an estimate of the location of the event of interest, and the estimated location can then be further refined utilizing information obtained by performing at least one automated Internet search. Such information characterizing the event of interest, and can be used to update the location estimate.

In some embodiments, location information from only a single one of the mobile devices 110 is used to determine the location of the event of interest. More generally, location information from multiple ones of the mobile devices 110 can be used to determine the location of the event of interest.

For example, location information from multiple ones of the mobile devices 110 can be used to define an event zone for the event of interest. An illustrative embodiment of such an arrangement will be described in more detail below in conjunction with FIG. 4. The FIG. 4 embodiment generally involves obtaining respective positions and pointing vectors for each of multiple ones of the mobile devices 110, and determining the location of the event of interest in a triangulation process utilizing the obtained positions and pointing vectors. The pointing vectors are illustratively determined using device orientation information of the multiple ones of the mobile devices 110.

Additionally or alternatively, it is also possible to utilize other types of information obtained from the mobile devices 110, such as focus distance information and/or scene recognition information from one or more of the mobile devices 110. In such embodiments, one or more characteristics of the event of interest can be determined using such information, possibly in combination with other information such as location information and device orientation information.

In some embodiments, the system 100 is configured to provide one or more instructions to at least one of the mobile devices 110 relating to capture of its corresponding video stream. Such instructions can come, for example, from the moderator station 112, the host station 114, or another system component.

Evaluating the received video streams relative to an event of interest in some embodiments further comprises evaluating the received video streams in terms of vantage point and/or in terms of at least one of image quality and subject relevancy.

Additionally or alternatively, evaluating the received video streams relative to an event of interest illustratively comprises applying at least one machine learning algorithm or other artificial intelligence (AI) algorithm, possibly involving utilization of a neural network, to automatically rank the video streams based at least in part on one or more vantage point metrics, one or more image quality metrics, and/or one or more other metrics, computed for each of at least a subset of the received video streams.

Selecting particular ones of the video streams for use in generation of crowd-stream video output based at least in part on results of the evaluating in some embodiments more particularly comprises ranking the received video streams based at least in part on results of the evaluating, and selecting particular ones of the ranked video streams for use the generation of the crowd-stream video output based at least in part on the ranking.

As another example, selecting particular ones of the video streams for use in generation of crowd-stream video output based at least in part on results of the evaluating in some embodiments comprises placing at least a subset of the users into a queue based at least in part on the results of the evaluating, and selecting users from the queue in a predefined order.

The above-described ranking and selecting functionality is illustratively performed at least in part in at least one of the moderator station 112, the host station 114 and the media server cluster 106 that communicates with the mobile devices 110. For example, the ranking and selecting functionality can be performed in a distributed manner utilizing multiple components of the system 100. Other arrangements of one or more processing devices can implement such functionality in other embodiments.

As a more particular example, the evaluation results generated in the system 100 can be provided to at least one of the moderator station 112 and the host station 114 by the media server cluster 106. The media server cluster 106 can then receive selection information from at least one of the moderator station 112 and the host station 114 responsive to providing the evaluation results. The selecting of particular ones of the video streams for use in generation of the crowd-stream video output illustratively comprises selecting the particular ones of the video streams based at least in part on the received selection information. The media server cluster 106 can then convey the selected video streams to the video server/mixer 102 for generation of the crowd-stream video output.

The video server/mixer 102 illustratively generates the crowd-stream video output utilizing at least portions of the selected video streams by combining portions of each of the selected video streams into a composite video stream that is delivered to the CDN web servers 108. For example, in some embodiments, the video server/mixer 102 can be configured to insert at least portions of the video streams of selected users into the crowd-stream video output as those users are selected from a queue. Selection of particular video streams in some embodiments therefore involves selecting their corresponding users from a caller queue or other type of queue that is populated at least in part based on automated rankings.

It is also possible that one or more image enhancement operations may be performed on at least a given one of the selected video streams prior to incorporating at least portions of the given selected video stream into the crowd-stream video output. Examples of such image enhancement operations include an image stabilization operation, a color correction operation, a cropping operation, a noise suppression operation, a blur filtering operation, an audio alteration operation, and a replacement operation to replace one or more persons with associated avatars. Other image enhancement operations, or various combinations of multiple image enhancement operations, may also be used.

As noted above, in addition to or in place of providing the crowd-stream video output to one or more of the CDN web servers 108, the video server/mixer 102 can upload the crowd-stream video output to at least one server of at least one social media platform, such as YouTube 116 or Facebook 118 in the FIG. 1 embodiment.

Additional aspects of illustrative embodiments will now be described with reference to FIGS. 2 through 4.

Assuming by way of example that a new event has just occurred somewhere and individuals are now calling in to the show, little may be known about event at the beginning. Thus, the process of the auto-ranking system is to first determine the unfolding event's location, for example, via the GPS location and focus distance from a single device, or by triangulating from multiple mobile devices' positions and camera orientations.

The preliminary location data can then be used to search online for information that may help identify the nature of the event, and better pinpoint the event location. Combined with local terrain, man-made obstructions, weather, known venues, and image processing data, an adaptive AI program can be configured to rank the video, by way of example, for each desirable vantage point per each event. Notably, per each event, there are likely several desirable vantage points, e.g., mid-court, players bench, etc. As such, separate caller queues are maintained for each vantage point where the callers wait for their turn to be interviewed, as necessary, by the moderator.

Alternatively, some events are prescheduled at known locations. For these, the show may actively solicit onsite callers whose mobile device location and orientation data will likely be used only for their vantage point ranking. Still, some events are spread out by nature, e.g., a festival. For these, localization of small events within the larger event (i.e., an "event within an event") via the techniques described herein can be achieved.

Prior to going live with video from a selected caller, at least one of the moderator and the host can direct one or more video editing tools in the media server cluster 106 and/or the video server/mixer 102 to further optimize the chosen caller's video. As indicated above, the optimizations can include image enhancements such as color correction, cropping, and noise suppression. Also, to protect the identity of the caller, a blur filter may be added, and any individual's likeness may be replaced with an avatar.

The automatic ranking of caller video in some embodiments involves the coordination of a Web-based application ("Web-app"), illustratively executing at least in part in each caller's mobile device browser environment via interaction with one or more of the servers of the media server cluster 106, with an Event Identifier program module ("Event Identifier"), illustratively executing at least in part in the moderator station 112 via interaction with one or more of the servers of the media server cluster 106. No caller needs to install any native application in the present embodiment. For the Web-app, while most of the processing occurs in the servers of the media server cluster 106, certain portions, e.g., one or more Java scripts, may be executed directly in the mobile device to improve responsiveness. For the purpose of illustrative embodiments, however, the particular manner in which the program execution tasks of the Web-app are divided between servers of the media server cluster 106 and the mobile devices 110 can vary. In other words, different embodiments can divide the program execution tasks between these and possibly other system components in a wide variety of different ways. The prosecution tasks of the Event Identifier and other program modules referred to herein can similarly be divided across multiple system components.

Figure 2:
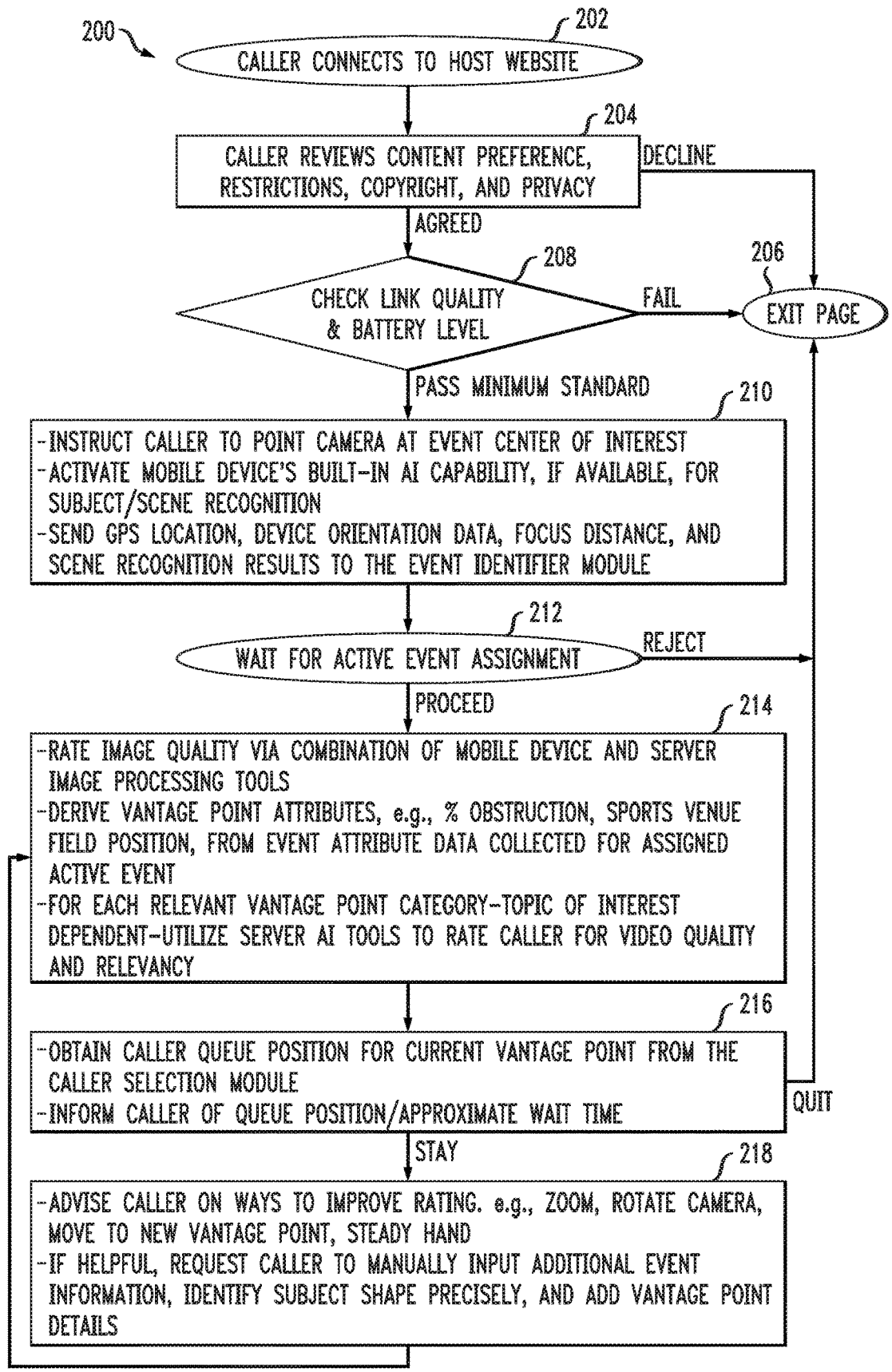
FIG. 2 is a flow diagram of a web-based application algorithm ("Web-app") for rating of caller video in an illustrative embodiment.

FIG. 2 shows a flow diagram of an automatic crowd-streamed video rating Web-app algorithm 200. The algorithm 200 is implemented as part of what is more generally referred to herein as a "crowd-stream video application" accessible via the mobile devices 110. The algorithm 200 includes steps 202 through 218.

In step 202, the application is initiated when a caller utilizes his or her mobile device to connect to a host website, illustratively by clicking on the site URL, although other activation mechanisms could be used in other embodiments.

In step 204, the first page a caller encounters displays the content preferences of the show at the moment along with any restrictions, as well as copyright and privacy notifications. Unsuitable callers are encouraged to exit at this step.

In step 206, if the caller declines to continue, the page is exited and the algorithm ends for that caller.

In step 208, functional capabilities of the caller's mobile device such as link quality and battery level are assessed. To assess link quality, many standard methods are available. One suitable approach is to first stream a short test video from the mobile device to the server, then to echo it back to the mobile device for self-assessment by the caller. The server can also directly measure jitter and delay of the test video and may also store some frames for later image analysis. Other functional capabilities that can be assessed in this step include mobile device processing capabilities. Those callers that pass the minimum standard are permitted to proceed to step 210 as indicated.

In step 210, the caller is instructed to point the mobile device camera at the event of interest, illustratively at an event center. Given permission by the caller, the Web-app then activates the mobile device's on-board AI capability to attempt to recognize the scene. The GPS location, device orientation data, focus distance, and scene recognition results are then sent to the Event Identifier for assessment.

In step 212, the caller waits for an Active Event assignment. The Event Identifier may take a number of different actions at this point. For example, the Event Identifier may choose to reject the call without assigning an Active Event tag. Alternatively, the Event Identifier may consider the call as part of an existing actively monitored event having an existing Active Event tag, and assign that Active Event tag to the call, or may consider the call as a new event that is initialized with assignment of a new Active Event tag. If the call is rejected by the Event Identifier, the current page is exited via a return to step 206. If the call is not rejected by the Event Identifier, the algorithm proceeds to step 214 as indicated. These and other references herein to rejection of a call may alternatively be viewed as rejection of the caller, and vice versa.

In step 214, the Web-app will proceed to rate the caller's video for image quality, vantage point advantage, and content relevancy.

To rate the caller's video image quality, the Web-app first activates the mobile device's built-in image analysis tools. If insufficient, the server's tools are used to assess stored sample frames or newly uploaded ones. These tools can rapidly quantify image quality attributes such as brightness, contrast, sharpness, image noise, resolution, stability, and relative size of poorly exposed areas.

The caller's vantage point advantage rating depends on the set of preferred vantage points for the assigned event, preconfigured per event type. Knowing the assigned Active Event for the call, the Web-app can access all the event attributes, such as the preferred vantage points, refined event position, and known obstructions, assembled by the Event Identifier. Thus, for example, at a sporting event, the preferred vantage points may consist of a close-up of the player's bench, a mid-field view of the entire field, or a close-up from back of the goals. For a celebrity event, full body and close-up frontal views are likely preferred. The least obstructed view that fills the screen with the preferred subject will likely rate higher at each given vantage point.

The server's AI tools can also rate the relevancy of the video subject given the show's current topic of interest. For example, while presenting a flower show, video of a dog may get a low relevancy rating. On the other hand, an image of a dog dressed as a flower would get a high rating. Over time, adaptive AI can grow in sophistication in terms of rating diverse subject compositions.

Given the image quality, vantage point, and subject relevancy ratings, a Caller Selection program module ("Caller Selection module"), illustratively executing on the moderator station 112 can then, also via AI or fixed criteria, assign a queue position to the caller. Each vantage point for an event illustratively has a separate queue. The moderator can opt to view multiple video streams from the top rated callers in each queue before selecting the one to interview next. For some topics, no interview may be needed and the caller with the most compelling video can go live with neither caller nor host commentaries.

In step 216, the caller queue position for the current vantage point is obtained from the Caller Selection module. Knowing the queue position of the call for the current vantage point, the Web-app can estimate and display the caller's wait time. If the caller quits, the current page is exited via a return to step 206. Otherwise, the caller stays in the queue and the algorithm proceeds to step 218 as indicated.

In step 218, the Web-app advises the caller on ways to improve his or her position in the queue. These methods may include holding the mobile device steady, rotating the camera, zooming, or shifting position.

It is possible that the caller may have received a low rating due to lack of information. As such, the Web-app may prompt the caller to manually input the missing event and vantage point data. To improve identification and vantage point rating, the caller may also be asked to outline the subject using the mobile device touchscreen. The caller's video will be re-rated at some point after sufficient corrective actions have been taken, illustratively via a return to step 214 as indicated in the figure.

Figure 3:
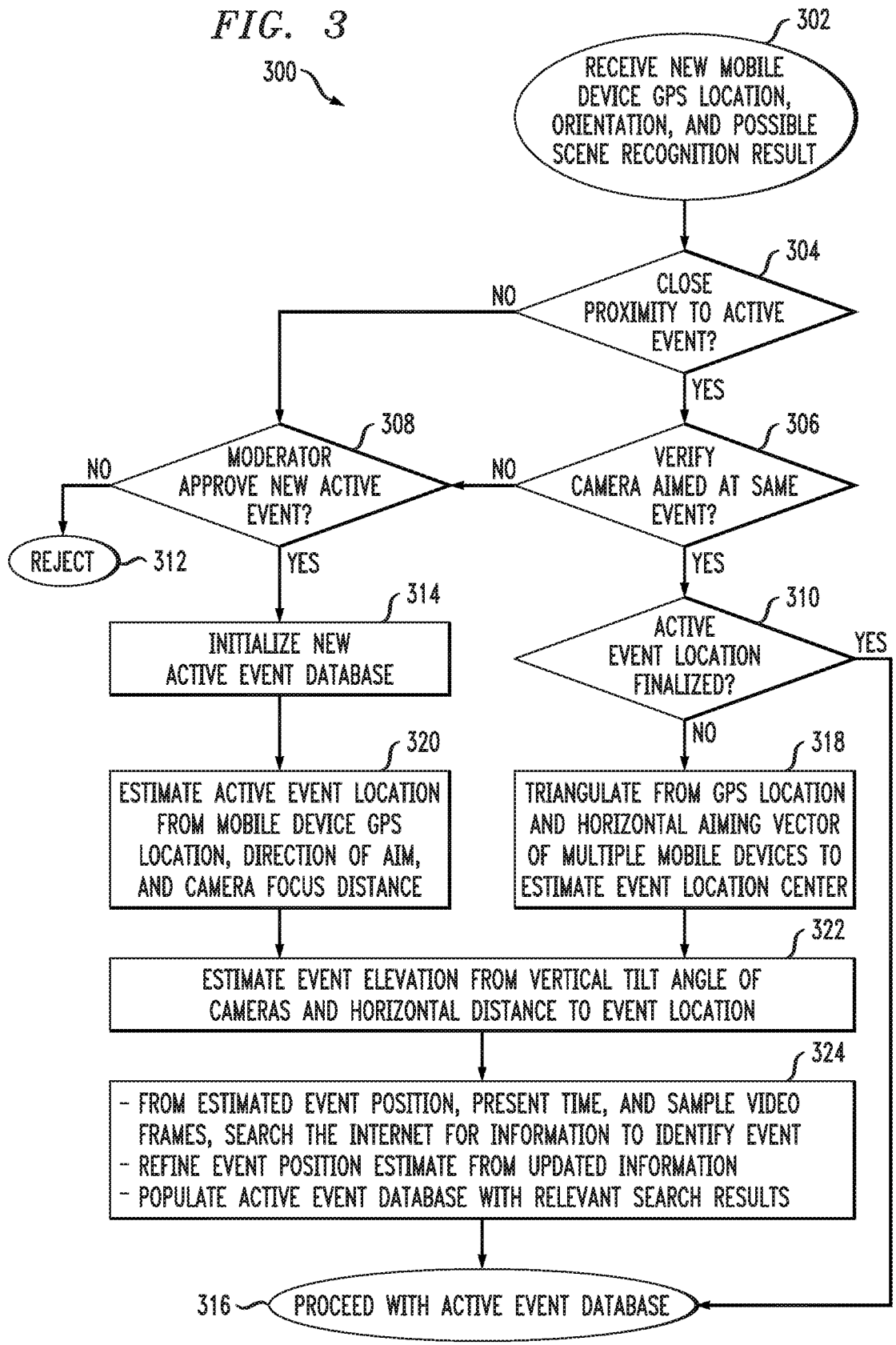
FIG. 3 is a flow diagram of an algorithm implemented by an Event Identifier program module in an illustrative embodiment.

FIG. 3 illustrates an algorithm 300 implemented by the Event Identifier in an illustrative embodiment. The algorithm 300 is executed in conjunction with execution of the crowd-stream video application accessible via the mobile devices 110. The algorithm 300 includes steps 302 through 324.

The Event Identifier in this embodiment is generally configured to identify and locate a new event. The Event Identifier also initiates the acceptance of new callers, as well as collecting location/event attributes. Similar to the Web-app, the processing performed by the Event Identifier may be divided between one or more servers of the media server cluster 106, and another processing device, in this case the moderator station 112.

In step 302, the Event Identifier receives mobile device GPS location, device orientation information, and any available auto-scene recognition result from a new caller.

In step 304, the Event Identifier attempts to match the caller's location to one from a known Active Event. If a match is found, the algorithm moves to step 306, and if no match is found, the algorithm moves step 308.

In step 306, the Event Identifier verifies that the caller's camera is aimed at the same matching event determined in step 304. For example, native and server based image recognition results can be reviewed to verify the match. This step accounts for the possibility that, at the same location, the caller may have noticed something new going on in a different direction, in other words, a new event unfolding at substantially the same location as the existing matching event. If the matching event is not verified, the algorithm proceeds to step 308, and otherwise proceeds to step 310.

In step 308, a determination is made as to whether or not the moderator has approved a new Active Event. For example, the moderator may decide to start a new Active Event track after reviewing available data, e.g., online searches. If the new Active Event is not approved, the algorithm proceeds to step 312. If the new Active Event is approved, the algorithm proceeds to step 314.

In step 310, a determination is made as to whether or not the Active Event location has been finalized. If the Active Event location has been finalized, the algorithm proceeds to step 316, and otherwise proceeds to step 318.

In step 312, the caller is rejected, as there is no existing matching Active Event and the moderator has declined to approve a new Active Event.

In step 314, a new Active Event database is initialized for the new Active Event approved by the moderator. The algorithm then proceeds to step 320.

In step 316, the caller is associated with the matching Active Event in the existing Active Event database for that event. The algorithm then ends for that caller.

In step 318, the Event Identifier triangulates from GPS locations and horizontal aiming vectors of multiple mobile devices in order to estimate an event location center. The horizontal aiming vectors are more generally referred to herein as "pointing vectors" of the respective mobile devices. Hence, in the present embodiment, mobile device data from a given caller may be pooled with that of previous callers in order to better define the event's location via triangulation. An example of such triangulation using multiple mobile devices will be described in conjunction with FIG. 4 below. The algorithm then proceeds to step 322.

In step 320, the Event Identifier estimates the Active Event location for the new Active Event from the mobile device GPS location, direction of aim and camera focus distance. Accordingly, as this caller is the first caller for the new Active Event, the corresponding mobile device's GPS location, direction of aim, and the distance to the spot its camera is focused are utilized to initially locate the event. It should be noted in this regard that the small cameras on most mobile devices typically have enormous depth of field and therefore neither the need nor the capability to focus precisely, and so the focus distance can be dropped from the location estimation process in other embodiments. More precise location estimation can be achieved via triangulation from positions and pointing vectors of multiple mobile devices, as will be described in more detail below with reference to FIG. 4.

After estimating the event location for the new Active Event, the algorithm proceeds to step 322.

In step 322, the Event Identifier estimates event elevation from vertical tilt angle of the mobile device cameras and horizontal distance to event location. The algorithm then proceeds to step 324.

In step 324, given the estimated event position, the present time, and sample video frames, the Event Identifier can then search the Internet, e.g., planned performance and news blogs, to identify the event. The automated searching of the Internet in step 324 illustratively leverages machine learning or other types of AI in order to more clearly identify an event based on an estimate of the event location.

Once the event is identified, the event position can be more accurately defined. This portion of the algorithm illustratively implements a positive feedback arrangement in which better identification of the event with the help of web searches can lead to even more accurate position estimate, in turn possibly leading to even more precise event identification (e.g., an event within an event), and thus better relevancy ratings. The location determination process ends once the Event Identifier is sufficiently confident of the location's accuracy.

Finally, the Event Identifier downloads and populates the Active Event database with searchable event attributes such as weather, terrain, manmade structure positions, venue description, etc. The algorithm then returns to step 316 as indicated.

It should be noted that the term "database" as used in this context and elsewhere herein is intended to be broadly construed, so as to encompass a set of stored information associated with a given Active Event. Multiple such sets of stored information for respective distinct Active Events can be stored in a single common database in other embodiments.

Provided with access to the assigned Active Event database, the caller activated Web-app is then empowered to execute its automatic caller video rating routine as previously described in conjunction with FIG. 2.

It is to be appreciated that the particular steps of the algorithms 200 and 300 of FIGS. 2 and 3 are presented by way of example only, and can be varied in other embodiments. For example, additional or alternative steps can be used, and/or the ordering of the steps can be varied, in other embodiments.

Figure 4:
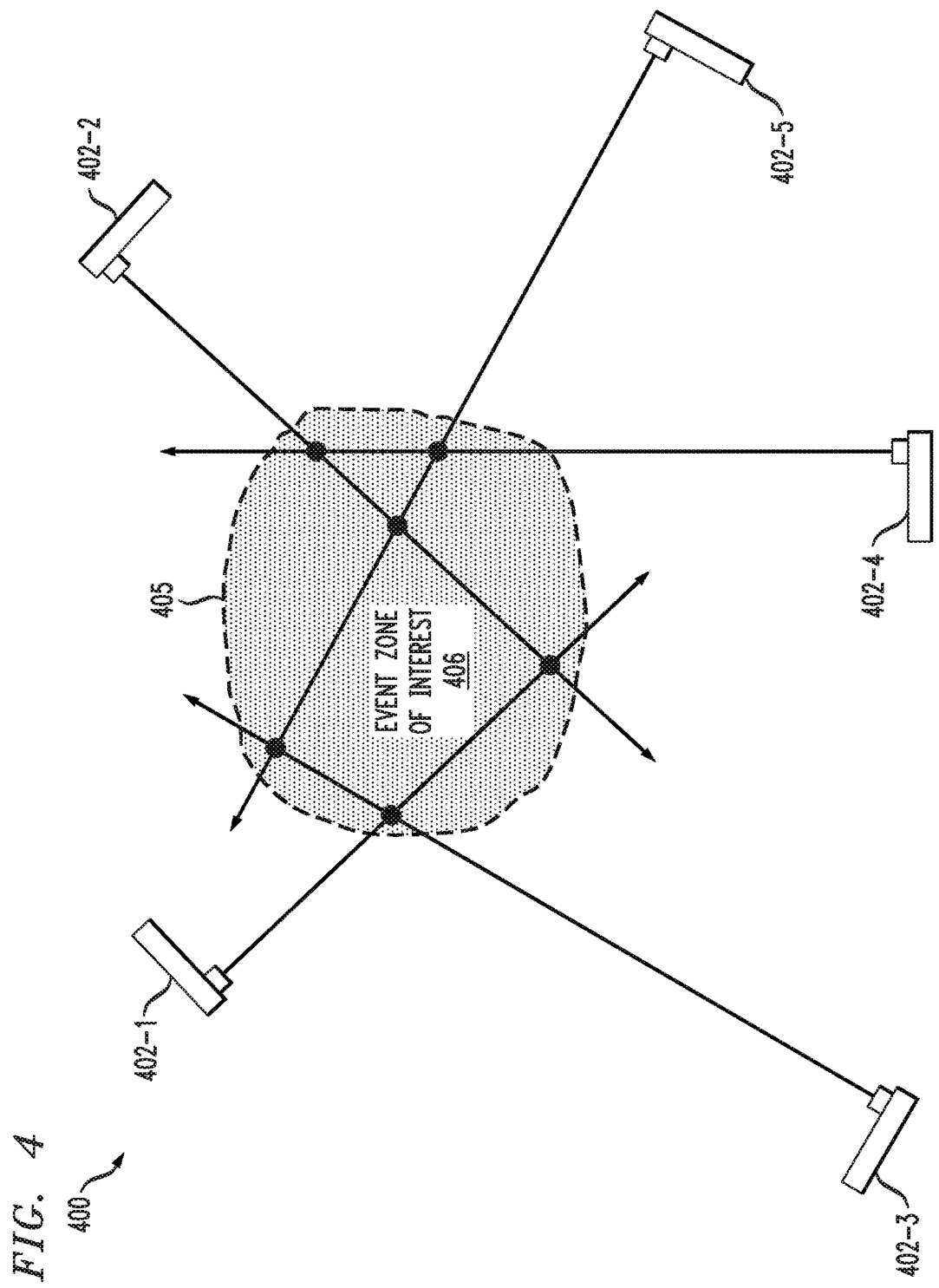
FIG. 4 illustrates zone of interest identification by triangulating mobile device positions and pointing vectors in one embodiment.

Referring now to FIG. 4, an example of the use of triangulation using mobile device positions and pointing vectors is shown. In the system 400, there are five mobile devices 402-1, 402-2, 402-3, 402-4 and 402-5 that have their respective cameras pointed towards a location 405 associated with an event of interest. Two-dimensional (2D) triangulation using the positions of the mobile devices 402 and their respective pointing vectors is utilized in the present embodiment to identify at least one zone of interest, such as zone of interest 406, associated with the event of interest. Different sets of the mobile devices 402 can be selected for use in the triangulation process, either arbitrarily or based on factors such as their respective vantage points, illustratively resulting in the identification of different zones of interest.

Accordingly, the FIG. 4 embodiment utilizes pointing vectors of selected mobile devices, as determined from their respective horizontal GPS positions and device orientations, to define a particular zone of interest. A given such zone's central position, illustratively derived from the average of triangulated intersection points of the type shown in the figure, provides a preliminary event location estimate. At this stage, it may be both quicker and more accurate to only locate the latitude and longitude of the event, as mobile devices typically have poor ability to determine elevation from GPS. The elevation of the event of interest can instead be estimated from the vertical tilt angle of selected mobile device cameras and their respective horizontal distances to the estimated event center.

It is to be appreciated that embodiments involving location/direction are just examples of possible use cases of the disclosed techniques. Other embodiments can apply these techniques in a wide variety of other use cases. For example, some embodiments are configured to automatically rank the callers based on the content of their video during a self-test. In an embodiment of this type in which the content relates to a dog show, then each caller could be ranked on how much their self-test video looks like a dog, etc.

As indicated previously, illustrative embodiments with one or more central media servers also allow for various types of content modification to occur in a central location. This can include, for example, image stabilization, color correction, noise suppression, etc. It can also include more advanced features say such as voice alteration or image blurring (e.g., if the topic is sensitive and one wants to protect the identity of the caller). Additionally or alternatively, a person can be replaced with an animated figure.

In the FIG. 1 embodiment, the content delivery system 100 in its video server/mixer 102 combines video from a live source with crowd-stream caller video from multiple mobile devices 110 as coordinated by media server cluster 106 and moderator and host stations 112 and 114. As shown in the figure, live video can be supplied to the video server/mixer from at least one HD camera, e.g., the HD camera 104 which may be associated with a live event or an electronic video gaming system. The video server/mixer 102 also receives one or more video streams from the media server cluster 106. It is the task of the video server/mixer 102 to combine the various video streams and to forward the mixed stream to the distributor.

The distributor can be configured to stream multiple versions of the same content, each encoded to different levels of quality of service (QoS). The viewing device of an end user negotiates with one or more of the CDN web servers to obtain the best quality video that its network connection can support. This aspect of the system can be considered standard practice and is therefore not illustrated in FIG. 1.

The caller/content contributors in the FIG. 1 embodiment are associated with respective mobile devices 110, and a given such mobile device can comprise a mobile telephone, a tablet computer or a laptop computer. Such devices are examples of what are also referred to herein as "client devices." A wide variety of different client devices in various combinations can be used in other embodiments.

The CDN web servers 108 in the FIG. 1 embodiment are examples of what are also referred to as distributed HTTP based web servers or simply as distributed web servers. Such servers can be configured to deliver a wide variety of media content other than live video. The CDN web servers 108 in some embodiments comprise a collection of distributed web servers that are set up in a cloud or other type of network, such as network 105, in order to distribute live video or other types of media content. Numerous other arrangements of distributed web servers can be used in other embodiments.

The video server/mixer 102 may comprise one or more video servers, and may also be referred to as a content provider server.

The network 105 over which the mobile devices 110, the media server cluster 106, the moderator and host stations 112 and 114, the video sever/mixer and the CDN web servers communicate is assumed to support HTTP communications. It should be noted that, although HTTP communications are used in the present embodiment, other embodiments can utilize other types of protocols for media streaming over the Internet, or more generally any of a wide variety of other techniques for media content delivery. At least a portion of the CDN web servers may be part of a cloud arrangement.

Each of the CDN web servers is configured for media streaming. Each such web server illustratively caches video segments and associated index files received from the video server/mixer over the network. The content delivery system can of course include multiple media server clusters and video server/mixer components, although only single instances of such components are shown in the figures for clarity and simplicity of illustration. Such components may be viewed as illustrative examples of what are more generally referred to as "media processors."

The moderator and host stations illustratively comprise respective computers as illustrated in the figure. Like the mobile devices and the servers of the media server cluster, such stations are configured to execute one or more applications to support crowd-stream caller video functionality as disclosed herein.

In some implementations, a given application can comprise portions of multiple applications. Accordingly, the term "application" as used herein is intended to be broadly construed. Such an application is also referred to herein as an "application program" although it is to be appreciated that an application program can itself comprise multiple distinct software programs.

Various authentication mechanisms can be used in illustratively embodiments in order to ensure that only callers presenting the appropriate credentials can participate in content contribution for crowd-stream caller video.

The mobile devices and other stations referred to herein are examples of client devices. It is to be appreciated that a wide variety of other client devices can be used. For example, other types of built-in clients can be used. Thus, a "client device" as that term is broadly used herein should not be construed as being limited, for example, to mobile devices or particular types of computers.

Media segments and associated index files are supplied by the video server/mixer to at least a subset of the CDN web servers over the network via one or more connections. The encoding of video in illustrative embodiments can utilize known encoding techniques such as H.264. Also, the segmenting of the encoded video can be performed in accordance with known streaming protocols such as Apple HLS or Microsoft Smooth Streaming (MSS).

It is to be appreciated, however, that a wide variety of different encoding and segmenting techniques can be used in other embodiments, including, by way of example only, those techniques described in the above-cited U.S. Pat. No. 9,900,362.

Each of the CDN web servers illustratively stores multiple index files as well as sets of video segments associated with respective ones of those index files. As noted above, index files are considered examples of what are more generally referred to herein as "playlists." The video segments are considered an example of what is more generally referred to herein as "media segments." A wide variety of different arrangements of index files or other types of playlists, and associated video segments or other types of media segments, can be used in different embodiments.

For example, in some embodiments, video can be streamed within the content delivery system utilizing HTTP streaming technology such as the above-noted HLS or MSS protocols. With HTTP streaming, video associated with a given content stream is first compressed and then segmented at the video server/mixer. As soon as a given video segment is ready, it is delivered to the CDN web servers so as to be available for mass distribution within the system. At session initiation, a media player obtains an initial master playlist indicating the available content streams and their associated web addresses (e.g., URLs). Depending on the streaming technology, locating the available content streams may be an indirect process where the master playlist points to index files that can be polled to indicate the URL and availability of the next segment.

Media streaming using HTTP based protocols has become ubiquitous due to its flexibility, compatibility with generic web servers such as CDN web servers for content distribution, and ability to traverse common firewalls. HTTP streaming standards such as Apple HLS generally work by breaking the content stream into small HTTP-based file segments, which are distributed to the CDN web servers and downloaded by request by a media player client via each segment's uniquely assigned web address (e.g., URL).

In some embodiments, HLS streaming relies on playlists that contain the URLs of the available media segments. These playlists reside in the same CDN web servers with the media segments to be streamed. At session initiation, a master playlist is illustratively downloaded, containing the URLs of the various alternative playlists available for the desired content. Mostly, the optional playlists allow the player to optimize playback based on screen resolution and bandwidth availability. Once given the playlist URLs, a built-in HLS client can autonomously download the referenced playlist, request media segments, then reconstruct and play the requested video stream.

In addition to the above-noted bandwidth options, HLS supports different content specific playlists, including live playlists, event playlists, and VoD playlists, as described in Apple Technical Note TN2288, which is incorporated by reference herein. The VoD playlist, which is used for playback of prerecorded media, contains references to all the media segments for the video. The client needs to download the list only once at the start of a session. On the other hand, both live and event types of broadcast require continuous updates to their respective playlists as new video segments are created and uploaded to the CDN web servers. As such, the client must also repeatedly download the referenced playlist to get the latest media segment URL.

Some embodiments disclosed herein are readily scalable to potentially large numbers of mobile devices, at least some of which are present at respective locations that are remote from a live video event venue.

Moreover, illustrative embodiments disclosed herein can be implemented at least in part using standard based built-in clients and HTTP servers, and thus at substantially reduced cost and complexity relative to conventional approaches.

Illustrative embodiments are not limited to use with the WebRTC, RTMP and/or HLS protocols. For example, the disclosed embodiments can be adapted for use with any HTTP based streaming protocol, including the Microsoft MSS protocol. Moreover, it is to be appreciated that other embodiments can be configured utilizing a wide variety of other types of streaming protocols and accordingly are not limited to use with live streaming or HTTP.

Embodiments of the invention can be implemented using any type of mobile device or more generally any other type of client device, including, for example, desktop, laptop or tablet personal computers, smart televisions, smart watches, gaming systems and other processing devices.

It should once again be noted that the above-described arrangements are exemplary only, and alternative arrangements can be used in other embodiments.

The disclosed techniques can also provide significant advantages in numerous content delivery contexts other than live event video.

A given client, server or other component in a content delivery system as disclosed herein is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations, such as mixing of live video and crowd-stream caller video from multiple mobile devices, associated with content delivery.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide additional or alternative functionality in other contexts. The disclosed techniques can be similarly adapted for use in a wide variety of other types of content delivery systems.

It is also to be appreciated that the particular process steps used in the embodiments described above are exemplary only, and other embodiments can utilize different types and arrangements of processing operations. For example, certain process steps shown in the flow diagrams as being performed serially can in other embodiments be performed at least in part in parallel with one another. Additional or alternative process steps can be used, and the order of the process steps can be varied.

It should again be emphasized that the embodiments of the invention as described herein are intended to be illustrative only. Other embodiments of the invention can be implemented utilizing a wide variety of different types and arrangements of content delivery systems, networks, and devices than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. A method comprising:
receiving video streams from a plurality of mobile devices associated with respective distinct users of a crowd-stream video application;
evaluating the received video streams relative to an event of interest, wherein the event of interest is determined at least in part by comparing information associated with a given one of the received video streams to a set of known events of interest and responsive to the information associated with the given received video stream not corresponding to any of the known events of interest in the set, identifying the information associated with the given received video stream as corresponding to a new event of interest previously unknown in the set and updating the set to include the previously-unknown event of interest;
obtaining location information from the mobile devices;
determining a location of the event of interest based at least in part on the obtained location information;
selecting particular ones of the video streams for use in generation of crowd-stream video output based at least in part on results of the evaluating;
generating the crowd-stream video output utilizing at least portions of the selected video streams; and
providing the crowd-stream video output to one or more servers of a content delivery network for delivery to one or more viewer devices;
wherein evaluating the received video streams relative to an event of interest comprises evaluating the received video streams in terms of at least vantage point relative to the event of interest;
wherein the vantage point is determined for each of one or more of the mobile devices utilizing a corresponding portion of the obtained location information and associated orientation information obtained from that mobile device;
wherein the method is implemented in at least one processing device comprising a processor coupled to a memory.

2. The method of claim 1 wherein the video streams comprise live video streams of the event of interest captured by respective ones of the mobile devices.

3. The method of claim 1 wherein one or more of the users of the crowd-stream video application each access the application by establishing a connection to a host website via a corresponding one of the mobile devices.

4. The method of claim 1 wherein determining a location of the event of interest based at least in part on the obtained location information comprises:
utilizing the obtained location information to generate an estimate of the location of the event of interest;
performing at least one automated Internet search to obtain information characterizing the event of interest; and
updating the estimate of the location based at least in part on the information obtained from the one or more automated Internet searches.

5. The method of claim 1 wherein determining a location of the event of interest based at least in part on the obtained location information comprises:
utilizing location information from multiple ones of the mobile devices to define an event zone for the event of interest.

6. The method of claim 1 wherein determining a location of the event of interest based at least in part on the obtained location information comprises:
obtaining respective positions and pointing vectors for each of multiple ones of the mobile devices; and
determining the location of the event of interest in a triangulation process utilizing the obtained positions and pointing vectors.

7. The method of claim 1 further comprising:
obtaining at least one of device orientation information, focus distance information and scene recognition information from one or more of the mobile devices; and
determining one or more characteristics of the event of interest based at least in part on the obtained at least one of device orientation information, focus distance information and scene recognition information.

8. The method of claim 1 further comprising providing one or more instructions to at least one of the mobile devices relating to capture of its corresponding video stream.

9. The method of claim 1 wherein evaluating the received video streams relative to an event of interest further comprises evaluating the received video streams in terms of at least one of image quality and subject relevancy.

10. The method of claim 1 wherein evaluating the received video streams relative to an event of interest further comprises applying at least one artificial intelligence algorithm to automatically rank the video streams based at least in part on one or more metrics computed for each of at least a subset of the received video streams.

11. The method of claim 1 wherein selecting particular ones of the video streams for use in generation of crowd-stream video output based at least in part on results of the evaluating comprises:
ranking the received video streams based at least in part on results of the evaluating; and
selecting particular ones of the ranked video streams for use the generation of the crowd-stream video output based at least in part on the ranking.

12. The method of claim 1 wherein selecting particular ones of the video streams for use in generation of crowd-stream video output based at least in part on results of the evaluating comprises:
placing at least a subset of the users into a queue based at least in part on the results of the evaluating; and
selecting users from the queue in a predefined order.

13. The method of claim 1 wherein the selecting is performed at least in part in at least one of a moderator station and a host station each coupled to a media server cluster that is configured to communicate with the mobile devices.

14. The method of claim 1 further comprising:
providing the evaluation results to at least one of a moderator station and a host station; and receiving selection information from at least one of the moderator station and the host station responsive to providing the evaluation results;

wherein the selecting of particular ones of the video streams for use in generation of the crowd-stream video output comprises selecting the particular ones of the video streams based at least in part on the received selection information.

15. The method of claim 1 wherein generating the crowd-stream video output utilizing at least portions of the selected video streams comprises combining portions of each of the selected video streams into a composite video stream.

16. The method of claim 12 wherein generating the crowd-stream video output utilizing at least portions of the selected video streams comprises inserting at least portions of the video streams of the selected users into the crowd-stream video output as those users are selected from the queue.

17. The method of claim 1 wherein generating the crowd-stream video output utilizing at least portions of the selected video streams comprises performing one or more image enhancement operations on at least a given one of the selected video streams prior to incorporating at least portions of the given selected video stream into the crowd-stream video output, wherein the one or more image enhancement operations comprise at least one of:
   an image stabilization operation;
   a color correction operation;
   a cropping operation;
   a noise suppression operation;
   a blur filtering operation;
   an audio alteration operation; and
   a replacement operation to replace one or more persons with associated avatars.

18. The method of claim 1 wherein providing the crowd-stream video output to one or more servers of a content delivery network for delivery to one or more viewer devices further comprises uploading the crowd-stream video output to at least one server of at least one social media platform.

19. An article of manufacture comprising a non-transitory computer-readable storage medium having computer program code embodied therein, wherein the computer program code when executed in at least one processing device causes said at least one processing device:
   to receive video streams from a plurality of mobile devices associated with respective distinct users of a crowd-stream video application;
   to evaluate the received video streams relative to an event of interest, wherein the event of interest is determined at least in part by comparing information associated with a given one of the received video streams to a set of known events of interest and responsive to the information associated with the given received video stream not corresponding to any of the known events of interest in the set, identifying the information associated with the given received video stream as corresponding to a new event of interest previously unknown in the set and updating the set to include the previously-unknown event of interest;
   to obtain location information from the mobile devices;
   to determine a location of the event of interest based at least in part on the obtained location information;
   to select particular ones of the video streams for use in generation of crowd-stream video output based at least in part on results of the evaluating;
   to generate the crowd-stream video output utilizing at least portions of the selected video streams; and
   to provide the crowd-stream video output to one or more servers of a content delivery network for delivery to one or more viewer devices;
   wherein evaluating the received video streams relative to an event of interest comprises evaluating the received video streams in terms of at least vantage point relative to the event of interest; and
   wherein the vantage point is determined for each of one or more of the mobile devices utilizing a corresponding portion of the obtained location information and associated orientation information obtained from that mobile device.

20. The article of manufacture of claim 19 wherein evaluating the received video streams relative to an event of interest further comprises evaluating the received video streams in terms of at least one of image quality and subject relevancy.

21. The article of manufacture of claim 19 wherein evaluating the received video streams relative to an event of interest further comprises applying at least one artificial intelligence algorithm to automatically rank the video streams based at least in part on one or more metrics computed for each of at least a subset of the received video streams.

22. An apparatus comprising:
   at least one processing device comprising a processor coupled to a memory;
   wherein said at least one processing device is configured:
   to receive video streams from a plurality of mobile devices associated with respective distinct users of a crowd-stream video application;
   to evaluate the received video streams relative to an event of interest, wherein the event of interest is determined at least in part by comparing information associated with a given one of the received video streams to a set of known events of interest and responsive to the information associated with the given received video stream not corresponding to any of the known events of interest in the set, identifying the information associated with the given received video stream as corresponding to a new event of interest previously unknown in the set and updating the set to include the previously-unknown event of interest;
   to obtain location information from the mobile devices;
   to determine a location of the event of interest based at least in part on the obtained location information;
   to select particular ones of the video streams for use in generation of crowd-stream video output based at least in part on results of the evaluating;
   to generate the crowd-stream video output utilizing at least portions of the selected video streams; and
   to provide the crowd-stream video output to one or more servers of a content delivery network for delivery to one or more viewer devices;
   wherein evaluating the received video streams relative to an event of interest comprises evaluating the received video streams in terms of at least vantage point relative to the event of interest; and
   wherein the vantage point is determined for each of one or more of the mobile devices utilizing a corresponding portion of the obtained location information and associated orientation information obtained from that mobile device.

23. The apparatus of claim 22 wherein evaluating the received video streams relative to an event of interest further comprises evaluating the received video streams in terms of at least one of image quality and subject relevancy.

24. The apparatus of claim 22 wherein evaluating the received video streams relative to an event of interest further comprises applying at least one artificial intelligence algorithm to automatically rank the video streams based at least in part on one or more metrics computed for each of at least a subset of the received video streams.

* * * * *